United States Patent
Chen

(10) Patent No.: US 11,842,574 B2
(45) Date of Patent: Dec. 12, 2023

(54) MAN-MACHINE INTERACTION METHOD AND SYSTEM, COMPUTER DEVICE, AND STORAGE MEDIUM

(71) Applicant: Ping An Technology (Shenzhen) Co., Ltd., Guangdong (CN)

(72) Inventor: Lin Chen, Guangdong (CN)

(73) Assignee: Ping An Technology (Shenzhen) Co., Ltd., Guangdong (CN)

( * ) Notice: Subject to any disclaimer, the term of this patent is extended or adjusted under 35 U.S.C. 154(b) by 569 days.

(21) Appl. No.: 17/167,466

(22) Filed: Feb. 4, 2021

(65) Prior Publication Data
US 2021/0158066 A1 May 27, 2021

Related U.S. Application Data

(63) Continuation of application No. PCT/CN2019/088235, filed on May 24, 2019.

(30) Foreign Application Priority Data

Oct. 11, 2018 (CN) .......................... 201811183781.7

(51) Int. Cl.
*G06F 17/00* (2019.01)
*G06V 40/70* (2022.01)
(Continued)

(52) U.S. Cl.
CPC ............ *G06V 40/70* (2022.01); *G06V 40/172* (2022.01); *G10L 17/22* (2013.01)

(58) Field of Classification Search
CPC ...... G06V 40/70; G06V 40/172; G06V 10/95; G10L 17/22; G10L 17/00; G06F 21/32; G06F 3/011; G06F 9/5072
See application file for complete search history.

(56) References Cited

U.S. PATENT DOCUMENTS 10,606,353 B2 * 3/2020 Ce Coleman .......... G16H 50/20
10,769,449 B2 * 9/2020 De Masi ................ G06V 20/52
(Continued)

FOREIGN PATENT DOCUMENTS

CN 101292282 A 10/2008
CN 102469064 A 5/2012
(Continued)

OTHER PUBLICATIONS

IPOS, First Written Opinion for Singapore Patent Application No. SG112021100936U, dated Jun. 29, 2022, pp. 1-7.
(Continued)

*Primary Examiner* — Greta L Robinson
(74) *Attorney, Agent, or Firm* — IP Spring

(57) ABSTRACT

The application discloses a main-machine interaction method and system, a computer device, and a storage medium. The method includes: an interaction end collects user information including biological sample information and preprocesses and filters the user information, and sends the preprocessed information to a central server; the central server assigns a biological recognition task and distributes the biological recognition task to a computing server; the computing server extracts biological characteristics from the biological sample information according to the biological recognition task, and returns obtained extraction results to the central server; the central server combines the extraction results to get a processing result; the processing result is returned to the interaction end; the interaction end responds to the processing result to complete a man-machine interaction with the user.

20 Claims, 4 Drawing Sheets

(51) Int. Cl.
*G10L 17/22* (2013.01)
*G06V 40/16* (2022.01)

(56) References Cited

U.S. PATENT DOCUMENTS

| | | | |
|---|---|---|---|
| 2011/0231182 A1 | 9/2011 | Weider et al. | |
| 2016/0308859 A1* | 10/2016 | Barry | G07C 9/22 |
| 2018/0082026 A1* | 3/2018 | Schneider | G06F 21/32 |
| 2020/0410265 A1* | 12/2020 | Chang | G06V 10/82 |

FOREIGN PATENT DOCUMENTS

| | | |
|---|---|---|
| CN | 106453470 A | 2/2017 |
| CN | 106790054 A | 5/2017 |
| CN | 107169796 A | 9/2017 |
| CN | 107908472 A | 4/2018 |
| CN | 108132768 A | 6/2018 |
| CN | 108351707 A | 7/2018 |
| CN | 109542216 A | 3/2019 |

OTHER PUBLICATIONS

CNIPA, First Office Action for Chinese Patent Application No. 201811183781.7, dated Nov. 24, 2021, 15 pages.
CNIPA, International Search Report for International Patent Application No. PCT/CN2019/088235, 2 pages, dated Aug. 26, 2019.

* cited by examiner

MAN-MACHINE INTERACTION METHOD AND SYSTEM, COMPUTER DEVICE, AND STORAGE MEDIUM

CROSS-REFERENCE TO RELATED APPLICATIONS

The application is a continuation under 35 U.S.C. § 120 of PCT Application No. PCT/CN2019/088235 filed on May 24, 2019, which claims priority 35 U.S.C. § 119(a) and/or PCT Article 8 to Chinese Patent Application No. 201811183781.7 filed on Oct. 11, 2018, the disclosures of which are hereby incorporated by reference in their entireties.

TECHNICAL FIELD

The application relates to the field of information processing, in particular to a man-machine interaction method and system, a computer device, and a storage medium.

BACKGROUND

A meeting place is a main place for people to have social contact, meeting communication, and recreational activity, and the scene layout, theme layout, lighting, and sound effect of the meeting place is an important factor to enhance the experience of participants. For example, the scene layout of a new product launch of technology products, such as tablet computer, mobile phone, and Virtual Reality (VR) glasses, mainly reflects modern style technology elements; for the layout of all kinds of exhibitions, such as World Expo, Car Expo, Cultural Expo, and Tea Expo, the large layout elements are determined by a exhibition theme, and manufacturers and exhibitors customize their own booths; in large banquets, press conferences, conferences, and other occasions, interactive communication methods are adopted by participants, such as question-and-answer exchange between a host and the participants, lottery activities, interactive games, etc.

At present, for the occasion with a large number of participants, a guide map is generally shown through an electronic bulletin board or an electronic screen, plus there is staff to guide the participants. This way is too old and not smart and flexible enough, and requires a lot of staff to participate; at the same time, interactions in the meeting place, such as statistical check-in, lottery activities, and question-and-answer exchange, between the organizer and the audience is too primitive, such as statistical check-in, lottery activities; and electronic devices can only passively display information and cannot interact with the participants. Such a man-machine interaction mode is at a low level of intelligence.

SUMMARY

Embodiments of the application provide a man-machine interaction method, a computer device, and a storage medium.

A man-machine interaction method includes the following operations.

An interaction end collects user request information, the user request information including biological sample information.

The interaction end preprocesses the user request information, and sends target request information obtained after preprocessing to a central server. The preprocessing includes filtering out biological sample information that does not conform to a preset characteristic extraction condition.

The central server assigns a biological recognition task for the target request information, saves the target request information to a storage platform, and distributes the biological recognition task to a computing server.

The computing server obtains the target request information corresponding to the biological recognition task from the storage platform according to the biological recognition task, extracts biological characteristics from the obtained target request information, and returns obtained extraction results to the central server.

The central server combines the extraction results to obtain user behavior data, matches the user behavior data with user behavior characteristics preset in the storage platform, and generates processing result information according to a matching result.

The central server returns the processing result information to the interaction end.

The interaction end reads and executes an instruction set from a preset configuration file according to the processing result information, the instruction set being used for completing a man-machine interaction with a user.

A man-machine interaction system includes an interaction end, a central server, and a computing server that are connected through a network.

The interaction end is configured to collect the user request information, the user request information including the biological sample information. The interaction end is further configured to preprocess the user request information, and send the target request information obtained after preprocessing to the central server. The preprocessing includes filtering out biological sample information that does not conform to the preset characteristic extraction condition.

The central server is configured to assign the biological recognition task for the target request information, save the target request information to the storage platform, and distribute the biological recognition task to the computing server.

The computing server is configured to obtain the target request information corresponding to the biological recognition task from the storage platform according to the biological recognition task, extract the biological characteristics from the obtained target request information, and return the obtained extraction results to the central server.

The central server is further configured to combine the extraction results to obtain the user behavior data, match the user behavior data with the user behavior characteristics preset in the storage platform, generate the processing result information according to the matching result, and return the processing result information to the interaction end.

The interaction end is further configured to read and execute the instruction set from the preset configuration file according to the processing result information. The instruction set is used for completing the man-machine interaction with the user.

A non-transitory readable storage medium storing a computer-readable instruction, the computer-readable instruction, when executed by one or more processors, causes the one or more processors to perform the steps of the man-machine interaction method.

The details of one or more embodiments of the application are set out in the drawings and description below, and other features and advantages of the application will become apparent from the description, the drawings, and the claims.

BRIEF DESCRIPTION OF THE DRAWINGS

In order to more clearly illustrate technical solutions in embodiments of the application, the drawings needed in the description of the embodiments are simply introduced below. It is apparent for those of ordinary skill in the art that the accompanying drawings in the following description are only some embodiments of the application, and some other accompanying drawings can also be obtained according to these drawings on the premise without contributing creative effort.

DETAILED DESCRIPTION OF THE EMBODIMENTS

The technical solutions in the embodiments of the application will be described clearly and completely below in combination with the drawings in the embodiments of the application. It is apparent that the described embodiments are not all embodiments but part of embodiments of the application. All other embodiments obtained by those of ordinary skill in the art based on the embodiments in the application without creative work shall fall within the scope of protection of the application.

Figure 1:
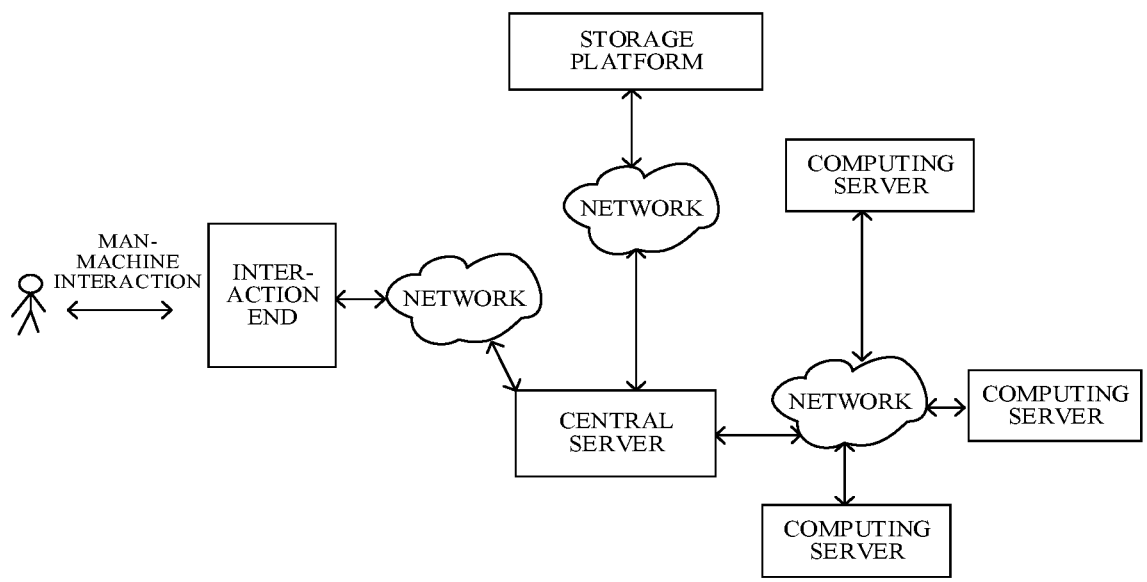
FIG. 1 is a schematic diagram of an application environment of a man-machine interaction method according to an embodiment of the application.

The man-machine interaction method provided by the application may be applied in an application environment in FIG. 1. An interaction end may be a computer terminal device, which is used for realizing an interaction with a user, displaying information to the user through an interface or projection, and sending a prompt tone to the user through an audio device. Interaction modes between the interaction end and the user include, but are not limited to, a response to face recognition, a response to speech recognition, and a response to the user's input through a touch screen and other input devices. A central server may be a server of a server cluster, which as the center of a man-machine interaction system, coordinates the interaction end, a computing server, and a storage platform to work together. The computing server may be a server or a server cluster, which is used for extracting characteristics from biological sample information. The storage platform may be a database or a distributed database, which is used for storing biological sample information and biological characteristic information of the user. The interaction end, the central server, the computing server, and the storage platform are connected through a network which may be a wired network or a wireless network. The man-machine interaction method provided by the embodiments of the application depends on the cooperation of the interaction end, the central server, and the computing server.

Figure 2:
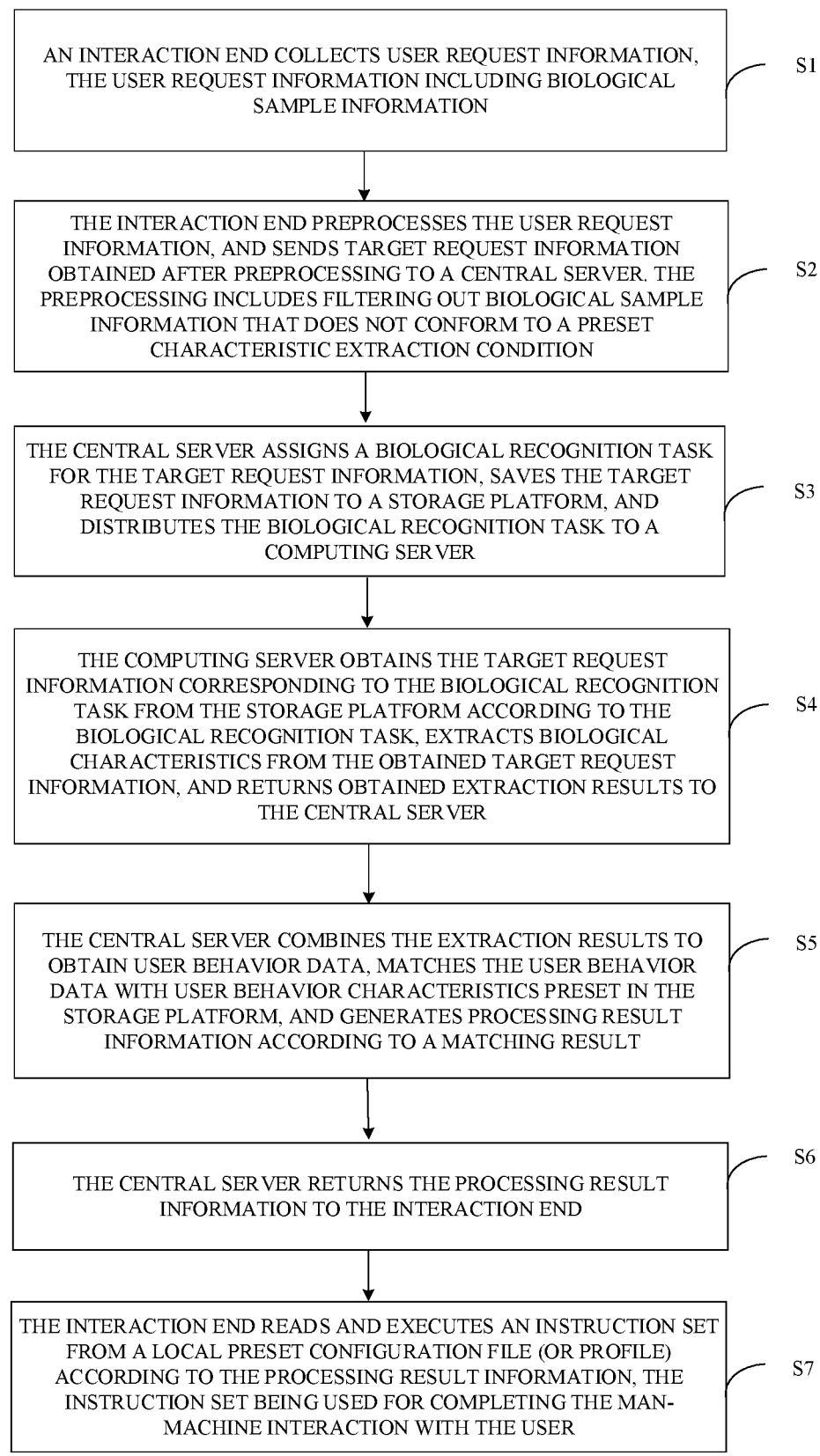
FIG. 2 is a flowchart of a man-machine interaction method according to an embodiment of the application.

In an embodiment, as shown in FIG. 2, a man-machine interaction method is provided, and its implementation process includes the following steps.

At S1, an interaction end collects user request information, the user request information including biological sample information.

The user request information is information input by a user through the interaction end, including the biological sample information and non-biological sample information. The biological sample information includes face information and voice information of the user, while the non-biological sample information includes, but is not limited to, identity information of the user.

The interaction end, as a terminal interacting with the user, is equipped with a camera, a voice recording device, a touch screen, and other input devices for collecting the user request information. The interaction end collects a face image of the user through the camera. The supported image formats include, but are not limited to, BMP, PNG, JPG, etc. The user's voice is collected through the voice recording device. The voice recording device is not limited to a microphone, but also includes a sampling and quantizing module and an audio coding module. Through the touch screen, character information handwritten by the user is collected, or the input of the user is responded to. The interaction end may also include a display screen or a projection device for displaying information.

Further, the interaction end may operate in two modes: registration mode and interaction mode, that is, the process of interaction between the user and the interaction end is divided into two stages: user information registration stage and man-machine interaction stage. In the registration mode, the interaction end is used for collecting the user request information and preprocessing the user request information; the central server distributes processing tasks, and the computing server is responsible for extracting characteristics. In the interaction mode, in addition to completing the interaction process in the registration mode among the interaction end, the central server, and the computing server, the central server also compares the current user characteristic information obtained by the computing server performing characteristic extraction with user characteristic information extracted in the registration mode, so as to respond to a user behavior and achieve the purpose of man-machine interaction.

The interaction end is installed with a mode switch in advance to set its operating mode. The mode switch may be a hardware switch or controlled by software. Through the mode switch, the interaction end may send the current operating mode to the central server, so that the central server may synchronize the current operating mode.

In a specific embodiment, the working process of interaction between the interaction end and the user includes the following contents (1) to (3), which are detailed as follows.

(1) The interaction end collects face information through the camera.

The user faces the camera for 3 seconds, and the interaction end prompts the taking of the photo through a prompt tone. The user may also operate it by herself/himself. For example, after facing the camera, the user may touch an interactive UI interface on the display screen and click to take a photo.

If a Java environment runs on the interaction end, the class method of ImageIO may be called to save binary image information obtained by the camera as a PNG file.

(2) The interaction end collects voice information of the user through the voice recording device.

The user inputs a sound through a microphone, and the sampling and quantizing module of the interaction end samples and quantizes the sound. Sampling is to read the amplitude of sound signal every certain time, and its corresponding parameter is a sampling frequency. Quantizing is used to convert the sampled amplitude of sound signal into a digital value, and its corresponding parameter is a sampling digit. Sampling is digitization of time, while quantizing is digitization of amplitude. For the sampling frequency, according to the Nyquist sampling theory, the sampling frequency is more than twice the highest frequency of an input signal, while the normal hearing frequency is 20-20 kHz, so preferably, the sampling frequency is 40 kHz as default. At the same time, there are also optional sampling frequencies of 44.1 kHz, 48 kHz, etc. The higher the sampling frequency, the better the sound quality. The sampling digit determines a dynamic range after an analog signal is digitalized. Other common digits are 8 and 16. The higher the quantization digit, the larger the dynamic range of signal, and the more likely the digitized audio signal is close to the original signal. Preferably, the sampling digit is 12.

The audio coding module codes sampled and quantized data. To ensure that a sound collection phase is not distorted, preferably the interaction end adopts Pulse Code Modulation (PCM) to code, which means that an analog audio signal is directly formed into a binary sequence only through sampling and analog-to-digital conversion without any coding and compression processing. The interaction end saves the coded voice information as a WAV file.

(3) The interaction end collects the character information through the touch screen.

The character information is mainly a variety of information input by the user through the touch screen, such as name, job number, seat number, contact number, and E-mail. The interactive UI interface on the display screen may receive information input of the user in the way of Web page. The user inputs the information into a form of the interactive interface and submits it. The interaction end may check the validity of the information input by the user, and the information is directly filtered at the interaction end to avoid sending error information to the central server. Validity refers to whether the information input by the user meets the basic requirements. For example, the number of characters of the input name should not exceed 10, the contact number can only be input in numbers, not letters, and an E-mail address must have a character "@".

The interaction end stores the information input by the user in the form of key-value pair, preferably in a JSON file.

(4) The interaction end sends the collected user request information to the central server through a socket channel. There is a receiving end corresponding to the socket channel at the central server, which is used for receiving.

At S2, the interaction end preprocesses the user request information, and sends target request information obtained after preprocessing to a central server. The preprocessing includes filtering out biological sample information that does not conform to a preset characteristic extraction condition.

The interaction end preprocesses the user request information. The preprocessing is mainly to filter out the biological sample information that does not conform to a preset feature extraction condition, so as to avoid sending it to the central server, thus reducing a processing burden of the computing server.

The preprocessing includes determining the color value of the face image, determining the size of the voice information, and integrating the user request information.

Determining the color value of the face image includes filtering out images that are too dark or too bright. For example, a photo taken in the dark without flash compensation makes face recognition more difficult. Similarly, a photo taken in the face of bright light also makes face recognition more difficult. Determining the size of the voice information is used for filtering out excessively large audio files. Integrating the user request information refers to assigning a user identity to different user information, and combining the face image information and the voice information corresponding to the user.

The preset characteristic extraction condition is targeted at the biological sample information, including but not limited to the contrast of the image and the distribution of pixel value for the face image information. For example, the interaction end regards the image with more than 80% black pixels (RGB value is 0, 0, 0) in the whole face picture as the image that is difficult to recognize, and also regards the image with more than 80% white pixels (RGB value is 255, 255, 255) in the whole face picture as the image that is difficult to recognize; then the percentage 80% of all black or all white pixels is regarded as a preset threshold. The voice information includes the size of a voice file. For example, the threshold of the size of a voice file is preset as 1 MB, that is, if the size of a voice information file coded by the interaction end exceeds 1 MB, it is determined that the voice file is invalid input voice information.

Specifically, for the face images, if it is the Java environment running on the interaction end, the interaction end may read an image file through the class method of ImageIO, obtain the RGB value of each pixel, and then compare it with the preset threshold, and filter the face images in which the number of all white or all black pixels exceeds the threshold.

For the voice file, its size may be calculated according to the following formula:

size of file (MB)=(sampling frequency*sampling digit*number of sound tracks*time)/(8*1024*1024).

The calculated size of file is compared to the preset threshold of the size of voice file, so as to filter out the voice files exceeding the threshold. Taking the voice file in WAV format for example, if the sampling frequency is 44.1 kHz, the sampling digit is 16, the number of sound tracks is 2 and the time is 3 seconds, then according to the above formula, the size of the WAV file is about 0.5 MB, which is less than the preset threshold 1 MB, so the voice file meets the preset characteristic extraction condition.

For integrating the user request information, the interaction end assigns a unique user identity to the user, at the same time, adds the face image and voice file of the user and the character information input by the user into an array, adds a user identity in front of the array as a flag at which the information begins, and adds a user identity and a character string "End" to the end of the array as the end of the information, thereby obtaining the target request information.

The interaction end sends the target request information obtained after preprocessing to the central server through the socket channel.

Specifically, the interaction end defines different sockets for the collected face image information, voice information and character information. For example, the face information is sent by socket 1, the voice information is sent by socket 2, and the character information is sent by socket 3.

At S3, the central server assigns a biological recognition task for the target request information, saves the target request information to a storage platform, and distributes the biological recognition task to a computing server.

The biological recognition task refers to the processing of the face image and the voice file in the request information by the computing server. The processing procedure includes extracting characteristics from the biological sample information.

The storage platform is used for storing the biological sample information, the biological characteristic information and various preset information related to man-machine interaction. The storage platform is composed of databases or distributed databases, including, but not limited to, various relational and non-relational databases, such as MS-SQL, Oracle, My SQL, Sybase, DB2, Redis, MongodDB, and Hbase.

The biological recognition tasks of different types may be assigned to different computing servers for execution. Each of the computing servers is used for performing one type of biological recognition task. For example, in a specific embodiment, the biological recognition task may be subdivided into a face recognition task and a voice recognition task. The computing servers may include a face recognition computing server specialized in processing the face recognition task and a voice recognition computing server specialized in processing the voice recognition task. The biological recognition task related to face recognition is performed by the face recognition computing server. The biological recognition task related to voice recognition is performed by the voice recognition computing server.

The central server distributes different biological recognition tasks to different computing servers for execution, and saves the target request information to the storage platform.

Specifically, the central server extracts the face image and the voice file in the target request information, assigns a storage path on the storage platform, and sends the storage path to the computing server. At the same time, the central server saves other target request information to the storage platform.

For example, the user identity of a user is 0001, the storage path of his/her face image on the storage platform is "/User/0001/image/", and the storage path of his/her voice file on the storage platform is "/User/0001/audio/". The central server sends the storage path to the face recognition computing server and the voice recognition computing server respectively. At the same time, the central server stores the face image in the path "/User/0001/audio/" of the storage platform, and stores other user request information, such as user identity information, in the database of the storage platform.

At S4, the computing server obtains the target request information corresponding to the biological recognition task from the storage platform according to the biological recognition task, extracts biological characteristics from the obtained target request information, and returns obtained extraction results to the central server.

The computing servers include the face recognition computing server and the voice recognition computing server. The face recognition computing server realizes the extraction of a face characteristic value, and the voice recognition computing server realizes the extraction of a voice information characteristic value.

Specifically, the face recognition computing server obtains the face image from the storage path on the storage platform according to the storage path, such as "/User/0001/image/", sent by the central server, and extracts face characteristics. The voice recognition computing server obtains the voice file from the storage path on the storage platform according to the storage path, such as "/User/0001/audio/", sent by the central server, and extracts voiceprint characteristics. Voiceprint is an acoustic spectrum carrying speech information displayed by an electro-acoustic instrument, which is one of biological recognition technologies.

After the computing server extracts biological characteristics, the obtained results include a face characteristic value and a voiceprint characteristic value of the user. The computing server saves the face characteristic value and the voiceprint characteristic value of the user to the storage platform, and returns extraction results to the central server. The extraction results include state values indicating extraction completion or failure and the feature values of facial features, and the face characteristic value, and the voiceprint characteristic value. Preferably, the face characteristic value in the extraction results is replaced by the storage path of the face characteristic value on the storage platform, and the voiceprint characteristic value in the extraction results is replaced by the storage path of the voiceprint characteristic value on the storage platform. For example, the user identity of a user is 0001, the storage path of his/her face characteristic value is "/User/0001/img_func/", and the storage path of his/her voiceprint characteristic value is "/User/0001/aud_func/".

At S5, the central server combines the extraction results to obtain user behavior data, matches (or compares) the user behavior data with user behavior characteristics preset in the storage platform, and generates processing result information according to a matching result (or comparison result).

The user behavior characteristic is an abstraction made according to the meaning of a user's action. The user behavior characteristic may be expressed as a group of data sets, including the face characteristic value, or characteristic values of expressions and actions, or the voice characteristic value, etc. This group of data sets may express a certain user requirement, for example, the user puts forward, through the voice, a query requirement for knowing the meeting summary to the interaction end, and the user puts forward a confirmation requirement for interacting with the interaction end through expressions.

The preset user behavior characteristics may be divided into a user query behavior, a user confirmation behavior, a user denial behavior, a user self-expression behavior, etc.

User behavior data is a data set obtained after the central server combines the extraction results of the computing server. The central server matches the user behavior data with the preset user behavior characteristics in the storage platform, so as to understand the user's needs and generate the corresponding response processing result information. The processing result information is the information used by the central server to instruct the interaction end to make a response.

Specifically, the central server combines the extraction results sent by the computing server to obtain a user behavior data array, and compares it with a preset user behavior characteristic array in the storage platform. If the matching result is that they are consistent, the meaning of the user's current behavior is determined, and the processing result information instructing the interaction end to make the corresponding response is generated.

At S6, the central server returns the processing result information to the interaction end.

When receiving the target request information sent by the interaction end, the central server caches identity information of each interaction end and the target request information, so as to return the processing result information.

Specifically, when receiving the target request information sent by the interaction end, the central server saves the identity information of the interaction end and the identity information corresponding to the target request information in a temporary variable. When it is necessary to return the processing result information to the interaction end, the central server obtains the identity information of the interaction end and the identity information corresponding to the target request information from the temporary variable, sets up a socket channel, and sends the channel to the interaction end. The identity information of the interaction end is used for identifying a unique interaction end, and the identity information corresponding to the target request information is used for uniquely identifying a unique user.

At S7, the interaction end reads and executes an instruction set from a local preset configuration file (or profile) according to the processing result information, the instruction set being used for completing the man-machine interaction with the user.

The local preset configuration file is an instruction set which is stored locally on the interaction end and used for enabling the interaction end to perform man-machine interaction related actions.

For example, the instruction set A is used for displaying information to the user, such as meeting summaries and introductions of participants; it causes the display screen of the interaction end to display relevant information or display the information to other positions by projection. The instruction B is used for prompting the user to perform the next operations, such as asking the user a question during the interaction, or waiting for the user's input.

It should be noted that the interaction ends may be composed of different hardware or realize different functions, so their default configuration files are different, and the instruction sets they can execute are different too. For example, the interaction end A can be fixed at the entrance of the meeting place for information guidance, while the interaction end B can move in the meeting place to interact with the user. The instruction set executed by the interaction end A for query may be different from the instruction set executed by the interaction end B for query.

Specifically, the instruction value corresponding to the action that the interaction end waits for the user's input is 0x0001, the instruction value corresponding to the action that the interaction end displays the information by projection is 0x0002, and the instruction value corresponding to the action that the interaction end receives, through the display screen, the user's input through the touch screen is 0x0003, then the instruction set that the interaction end coheres this series of actions to respond to a user query is {0x0001, 0x0002, 0x0003}.

In the embodiment, the interaction end is responsible for collecting the user request information and providing a man-machine interaction interface, preprocessing and filtering the user request information, and sending the preprocessed target request information to the central server to share the processing pressure for the central server. The computing server, as the center of the man-machine interaction system, assigns the biological recognition task for the interaction, schedules the computing server to perform specific computing task, saves the target request information to the storage platform, and coordinates a data flow among the interaction end, the computing server and the storage platform. The computing server is responsible for performing the biological recognition task, extracting the biological characteristic information, and returning the extraction results to the central server. The central server combines the extraction results sent by the computing server, and matches it with the preset user behavior characteristics in the storage platform, and then issues the processing result information to the interaction end. The interaction end executes the instruction set according to the processing result information and completes the man-machine interaction with the user. An intelligent man-machine interaction mode based on the biological recognition technology is provided, and the level of intelligence of the man-machine interaction is improved.

Further, in an embodiment, after S2, that is, the interaction end preprocesses the user request information, and sends the target request information obtained after preprocessing to the central server, the preprocessing including filtering out the biological sample information that does not conform to the preset characteristic extraction condition, the man-machine interaction method further includes the following steps.

For the biological sample information that does not conform to the preset characteristic extraction condition, the interaction end sends an information collection abnormality message to the user and collects the biological sample information again.

The information collection abnormality message is the information to remind the user that the current operation is wrong, and prompt the user to perform the next operation. The information collection abnormality message may be sent to the user through the UI interface of the display screen, a voice prompt, etc.

Specifically, after the interaction end preprocesses the biological sample information, for the biological sample information that does not conform to the characteristic extraction condition, it may send the information collection abnormality message to the user through the display screen or the audio device in the form of graphic images or sound.

In the embodiment, for the biological sample information that does not conform to the characteristic extraction condition, the interaction end sends the information collection abnormality message to the user timely and collects the biological sample information again, which saves system overhead and time cost compared with processing by the computing server.

Figure 3:
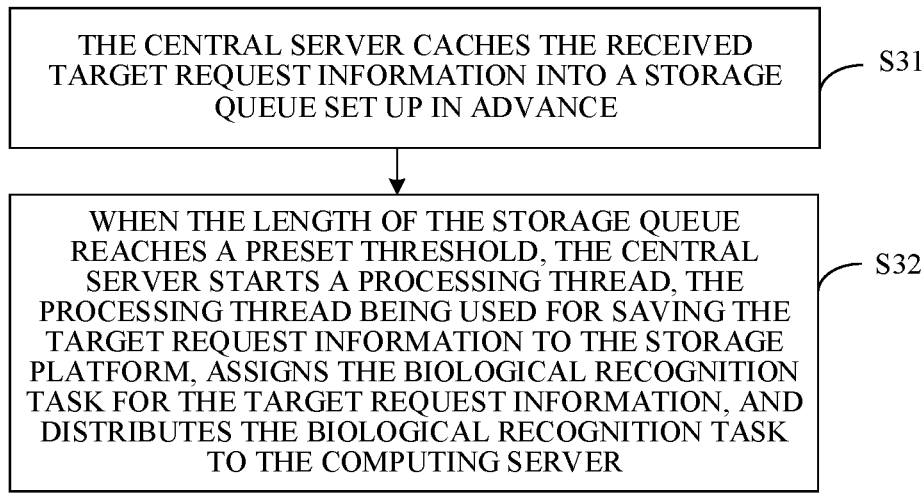
FIG. 3 is a flowchart of step S3 in a man-machine interaction method according to an embodiment of the application.

Further, in an embodiment, as shown in FIG. 3, at S3, that is, the central server assigns the biological recognition task for the target request information, saves the target request information to the storage platform, and distributes the biological recognition task to the computing server, specifically includes the following steps.

At S31, the central server caches the received target request information into a storage queue set up in advance.

The storage queue is used for caching the target request information of the interaction end, so as to enable the central server to ensure the system stability while responding to the request of the interaction end timely.

Specifically, the central server sets up two arrays in advance as the storage queues, one for caching the face image and one for caching the voice file.

At S32, when the length of the storage queue reaches a preset threshold, the central server starts a processing thread, the processing thread being used for saving the target request information to the storage platform, assigns the biological recognition task for the target request information, and distributes the biological recognition task to the computing server.

The preset threshold is determined based on the memory of a hardware host memory of the central server. In order to ensure the normal operation of the central server, preferably, the amount of memory occupied by each cache queue is preset to 15% of the total memory capacity.

The processing thread is used for saving the target request information to the storage platform, assigning the biological recognition task for the target request information, and distributing the biological recognition task to the computing server.

Specifically, the processing thread first detects the value of each cache queue. If a certain queue is empty, the thread is not started for the queue. If the queue is not empty, the thread is started for the queue. If the cache queue of the face image is not empty, then a face characteristic extraction task thread is started, which is used for saving the face image to the storage platform and distributing face characteristic extraction task to the computing server. If the cache queue of the voice file is not empty, then a voice characteristic extraction task thread is started, which is used for saving the voice file to the storage platform and distributing voiceprint characteristic extraction task to the computing server.

In the embodiment, the central server sets up the cache queues for the face image and the voice file with large amount of data respectively to relieve the processing pressure of the central server, so that the central server can ensure the system stability while timely responding to the request of the interaction end.

Figure 4:
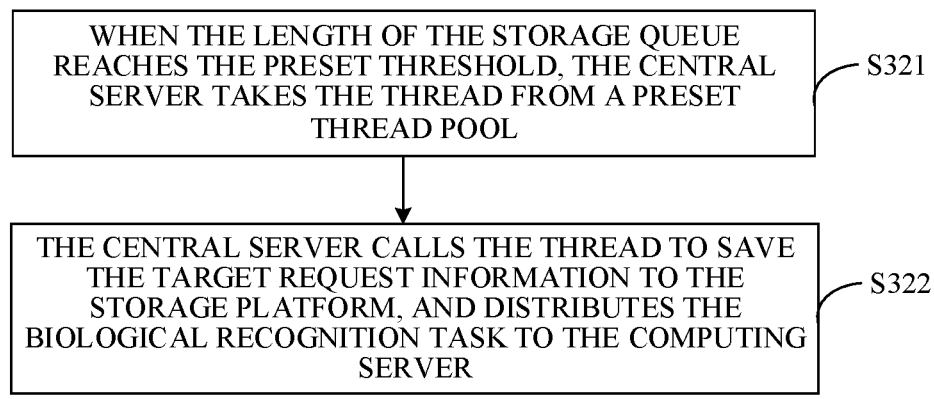
FIG. 4 is a flowchart of step S32 in a man-machine interaction method according to an embodiment of the application.

Further, in an embodiment, as shown in FIG. 4, at S32, that is, if the length of the storage queue reaches the preset threshold, the central server starts the processing thread, the processing thread being used for saving the target request information to the storage platform, assigns the biological recognition task for the target request information, and distributes the biological recognition task to the computing server, specifically includes the following steps.

At S321, when the length of the storage queue reaches the preset threshold, the central server takes the thread from a preset thread pool.

The thread pool is a set of threads. That the system frequently creates and destroys the thread in a short period of time will increase the system overhead and increase the system burden. Using the thread pool may reduce the system overhead.

The central server creates a thread pool and maintains the thread in the thread pool, so as to prevent the thread from being destroyed after it performs the task and enable it to continue to perform the next task. The size of the thread pool represents the maximum number of threads in the thread pool. The size of the thread pool may be determined by the number of cores of the native CPU. If the central server is a CPU with 32 cores, the size of the thread pool is 32.

Specifically, the central server may call ThreadPoolExecutor class to set up a thread pool, and then, as long as the threads in the thread pool are not busy, the central server takes the threads from the thread pool in a circular sequence. When the threads in the thread pool are in a full busy state, it means that the response capability of the central server has reached the upper limit, and the central server will return a message to inform the interaction end, and to try again later.

At S322, the central server calls the thread to save the target request information to the storage platform, and distributes the biological recognition task to the computing server.

The thread called from the thread pool by the central server does the same work as the single thread in S32, namely saving the face image to the storage platform and distributing the face characteristic extraction task to the computing server, and saving the voice file to the storage platform and distributing the voiceprint characteristic extraction task to the computing server.

In the embodiment, the central server saves the target request information to the storage platform by setting the thread pool, and turns the work of distributing the biological recognition tasks into a multi-threaded working mode, which improves the working efficiency of the system.

Further, in an embodiment, at S7, that is, the interaction end reads and executes the instruction set from the local preset configuration file according to the processing result information, the instruction set being used for completing the man-machine interaction with the user, specifically includes the following steps.

When the interaction end fails to read the instruction set from the local preset configuration file, the interaction end reads and executes the instruction set in a cloud preset configuration file from the central server.

Relative to the local preset configuration file, the cloud preset configuration file is stored in the central server. For some new user requirements, there is no corresponding instruction set in the local preset configuration file, and the interaction end may load and execute the instruction set from the central server. Or, when the interaction end is short of local storage space, the interaction end may read and execute the instruction set from the central server.

Specifically, the interaction end queries the corresponding instruction set from the local preset configuration file according to the processing result information. If the interaction end fails to query from the local preset configuration file, it takes the identity information of the processing result information as a retrieve condition and sends an instruction set reading request to the central server through the network. If the interaction end matches the corresponding instruction set from the central server, it reads and executes the instruction set.

In the embodiment, the instruction set may be read and executed not only from the local configuration file on the interaction end, but also from the central server, so that the interaction end may read and execute the instruction set from multiple sources, which extends the capability of the interaction end to respond to the user request.

Further, in an embodiment, if the interaction end fails to read the instruction set from the local preset configuration file, the interaction end reads and executes the instruction set in the cloud preset configuration file from the central server, specifically includes the following steps.

When the interaction end fails to read or execute the instruction set in the cloud preset configuration file from the central server, the interaction end sends alarm information to the user.

If there is no instruction set matching the processing result information on the central server, the interaction end sends the alarm information to the user. The alarm information is used for informing the user of the reason why the current operation of the user cannot be performed. For example, the user does not speak clearly, and the meaning cannot be recognized, so a correct response cannot be made.

Specifically, the interaction end may send the alarm information to the user through the display screen or the audio device in the form of graphic image or sound. For example, the UI interface is displayed through the display screen to inform the user that the behavior cannot be correctly recognized, and ask the user to operate again.

In the embodiment, the interaction end informs the user of the reason for the failure of the execution of the processing result information, which improves the man-machine interaction process without missing the blind area of system response.

Figure 5:
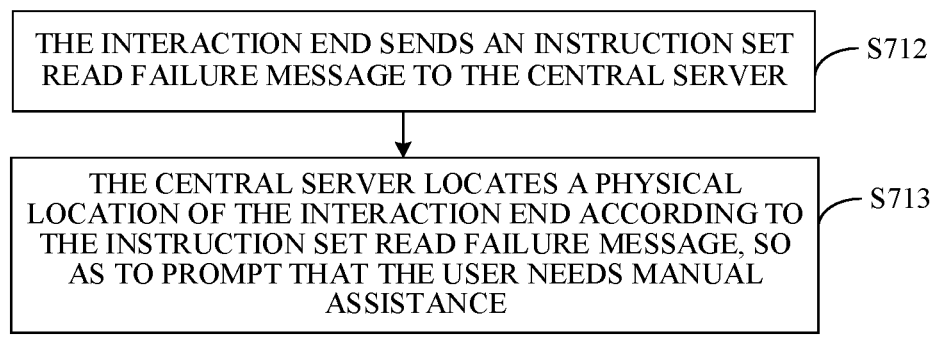
FIG. 5 is a flowchart of a man-machine interaction method according to another embodiment of the application.

Further, in an embodiment, as shown in FIG. 5, after the interaction end sends the alarm information to the user if the interaction end fails to read and execute the instruction set in the cloud preset configuration file from the central server, the man-machine interaction method further includes the following steps.

At S712, the interaction end sends an instruction set read failure message to the central server.

There are positioning devices on the interaction end, such as Beidou, GPS and AGPS. In a large meeting place, a number of interaction ends may be deployed. Each of the interaction ends is at a different location, and some may be far apart. If the interaction end fails to read the instruction set from the preset configuration file, and the interaction end fails to read or execute the instruction set from the central server, the interaction end sends the instruction set read failure message to the central server. The instruction set read failure message includes the location information of the interaction end itself and the identity of the processing result information.

Specifically, the interaction end adds its own physical location information to the instruction set read failure message through the positioning device, at the same time, adds an identity number corresponding to the processing result message that cannot be executed correctly to the instruction set read failure message, and sends the message to the central server through the socket.

At S713, the central server locates a physical location of the interaction end according to the instruction set read failure message, so as to prompt that the user needs manual assistance.

Specifically, the central server parses the instruction set read failure message, and obtains the physical location of the interaction end and the identity number corresponding to the processing result information. The physical location of the interaction end is used for positioning, and the identity corresponding to the processing result information corresponds to the user behavior data, which can be used for tracing the user's behaviors that cannot be recognized.

In the embodiment, the interaction end sends its own identity information to the central server, so that the central server can locate the location of the interaction end, so as to guide the staff to the site to help the users solve the problem in the operation. In this way, the problem in the man-machine interaction can be located quickly and accurately, and aided by manual help.

Figure 6:
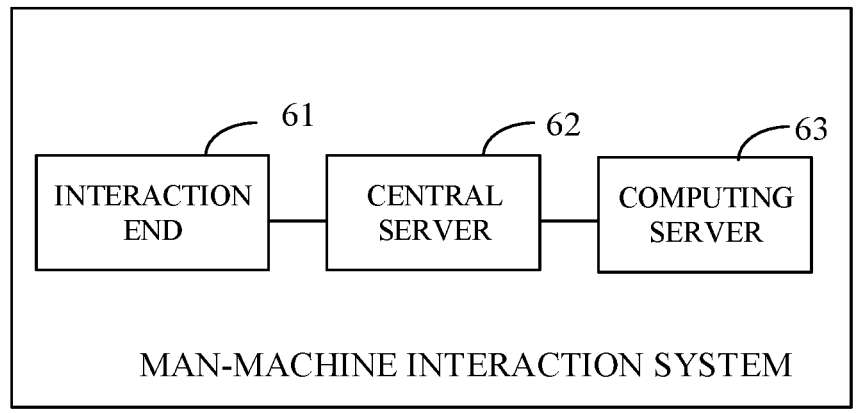
FIG. 6 is a schematic diagram of a man-machine interaction system according to an embodiment of the application.

In an embodiment, a man-machine interaction system is provided. The man-machine interaction system corresponds to the man-machine interaction method in the above embodiment. As shown in FIG. 6, the man-machine interaction system includes an interaction end 61, a central server 62, and a computing server 63. Each functional module is described in detail below.

The interaction end 61 is configured to collect the user request information, the user request information including the biological sample information, preprocess the user request information, and send the target request information obtained after preprocessing to the central server. The preprocessing includes filtering out the biological sample information that does not conform to the preset characteristic extraction condition.

The central server 62 is configured to assign a biological recognition task for the target request information, save the target request information to the storage platform, and distribute the biological recognition task to the computing server.

The computing server 63 is configured to obtain the target request information corresponding to the biological recognition task from the storage platform according to the biological recognition task, extract the biological characteristics from the obtained target request information, and return the obtained extraction results to the central server.

The central server 62 is further configured to combine the extraction results to obtain the user behavior data, match the user behavior data with the user behavior characteristics preset in the storage platform, generate the processing result information according to the matching result, and return the processing result information to the interaction end.

The interaction end 61 is further configured to read and execute the instruction set from the preset configuration file according to the processing result information. The instruction set is used for completing the man-machine interaction with the user.

Further, the interaction end 61 includes a resampling module. The resampling module is configured to, for the biological sample information that does not conform to the preset characteristic extraction condition, send the information collection abnormality message to the user, and collect the biological sample information again.

Further, the central server 62 includes a caching module. The caching module is configured to cache the received target request information into the storage queue set up in advance, and if the length of the storage queue reaches the preset threshold, start the processing thread. The processing thread is used for saving the target request information to the storage platform, assigning the biological recognition task for the target request information, and distributing the biological recognition task to the computing server.

Further, the central server 62 further includes a thread calling module. The thread calling module is configured to, if the length of the storage queue reaches the preset threshold, take the thread from the preset thread pool, call the thread to save the target request information to the storage platform, and distribute the biological recognition task to the computing server.

Further, the interaction end 61 further includes an instruction obtaining module. The instruction obtaining module is configured for, if the interaction end fails to read the instruction set from the local preset configuration file, the interaction end to read and execute the instruction set in the cloud preset configuration file from the central server.

Further, the interaction end 61 further includes a first alarm module. The first alarm module is configured to, if it is failed to read or execute the instruction set in the cloud preset configuration file from the central server, send the alarm information to the user.

Further, the interaction end 61 further includes a second alarm module. The second alarm module is configured to send the instruction set read failure message to the central server.

Further, the central server 62 further includes an auxiliary module. The auxiliary module is configured to locate the physical location of the interaction end according to the instruction set read failure message, so as to prompt that the user needs manual assistance.

For specific descriptions of the man-machine interaction system, please refer to the descriptions of the man-machine interaction method mentioned above, which will not be repeated here. Each module in the man-machine interaction system may be realized in whole or in part by software, hardware, and their combination. Each above module may be embedded in or independent of a processor in a computer device in the form of hardware, or stored in a memory in the computer device in the form of software, so that the processor may call and perform the operation corresponding to each module above.

Figure 7:
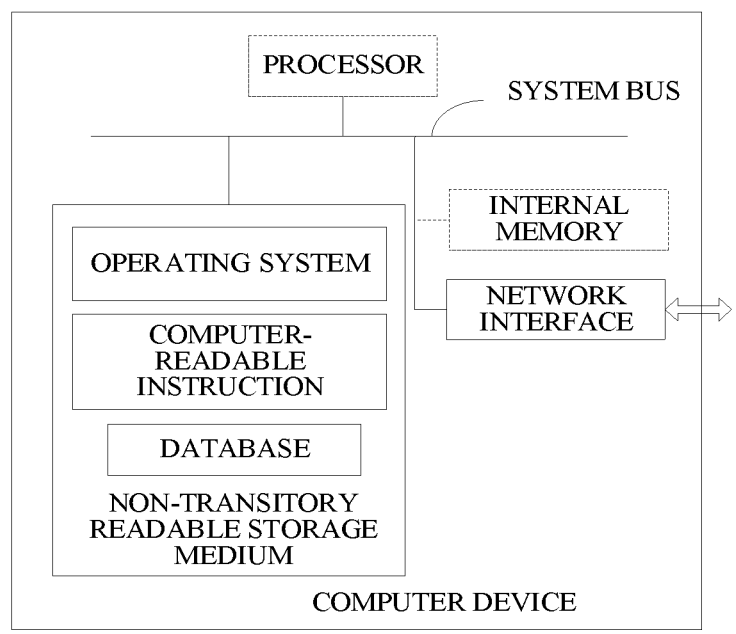
FIG. 7 is a schematic diagram of a computer device according to an embodiment of the application.

In an embodiment, a computer device is provided. The computer device may be a server, and its internal structure may be shown in FIG. 7. The computer device includes a processor, a memory, a network interface, and a database connected through a system bus. The processor of the computer device is used to provide computing and control capabilities. The memory of the computer device includes a non-transitory storage medium and an internal memory. The non-transitory storage medium stores an operating system, a computer-readable instruction, and a database. The internal memory provides an environment for the operation of the operating system and the computer-readable instruction. The network interface of the computer device is used to communicate with an external terminal through a network connection. The computer-readable instruction, when executed by the processor, implements a man-machine interaction method.

In an embodiment, a computer device is provided, which includes: a memory, a processor and a computer-readable instruction stored in the memory and capable of running on the processor. The processor, when executing the computer-readable instruction, implements the steps, such as S1 to S7 shown in FIG. 2, of the man-machine interaction method in the above embodiments.

In an embodiment, one or more non-transitory readable storage media storing a computer-readable instruction are provided. The computer-readable instruction, when executed by one or more processors, implements the man-machine interaction method in the above method embodiment. Or, the computer-readable instruction, when executed by one or more processors, realizes the function of each module/unit in the above system embodiment or device embodiment. In order to avoid repetition, the above will not be described herein in detail.

Those of ordinary skill in the art may understand that all or a part of flows of the method in the above embodiments may be completed by related hardware instructed by a computer-readable instruction. The computer-readable instruction may be stored in a non-transitory computer-readable storage medium. When executed, the computer-readable instruction may include the flows in the embodiments of the method. Any reference to memory, storage, database, or other media used in each embodiment provided in the application may include non-transitory and/or transitory memories. The non-transitory memories may include a Read-Only Memory (ROM), a Programmable Read-Only Memory (PROM), an Electrically Programmable Read-Only Memory (EPROM), an Electrically Erasable Programmable Read-Only Memory (EEPROM), or a flash memory. The transitory memories may include a Random Access Memory (RAM) or an external cache memory. As an illustration rather than a limitation, the RAM is available in many forms, such as Static RAM (SRAM), Dynamic RAM (DRAM), Synchronous DRAM (SDRAM), Double Data Rate SDRAM (DDRAM), Enhanced SDRAM (ESDRAM), Synch-link DRAM (SLDRAM), Rambus Direct RAM (RDRAM), Direct Memory Bus Dynamic RAM (DRDRAM), and Memory Bus Dynamic RAM (RDRAM).

Those of ordinary skill in the art may clearly understand that, for the convenience and simplicity of description, illustration is given only based on the division of the above functional units and modules. In the practical applications, the above functions may be allocated to different functional units and modules for realization according to needs, that is, the internal structure of the system is divided into different functional units or modules to realize all or part of the functions described above.

The above embodiments are only used for illustrating, but not limiting, the technical solutions of the disclosure. Although the disclosure is elaborated referring to the above embodiments, those of ordinary skill in the art should understand that they may still modify the technical solutions in each above embodiment, or equivalently replace a part of technical features; but these modifications and replacements do not make the nature of the corresponding technical solutions depart from the spirit and scope of the technical solutions in each embodiment of the disclosure, and these modifications and replacements should be included in the scope of protection of the disclosure.

What is claimed is:

1. A man-machine interaction method, comprising:
   collecting, by an interaction end, user request information, wherein the user request information comprises biological sample information;
   preprocessing, by the interaction end, the user request information, and sending target request information obtained after preprocessing to a central server, wherein the preprocessing comprises filtering out biological sample information that does not conform to a preset characteristic extraction condition;
   assigning, by the central server, a biological recognition task for the target request information, saving the target request information to a storage platform, and distributing the biological recognition task to a computing server;
   obtaining, by the computing server, the target request information corresponding to the biological recognition task from the storage platform according to the biological recognition task, extracting biological characteristics from the obtained target request information, and returning obtained extraction results to the central server;
   combining, by the central server, the extraction results to obtain user behavior data, matching the user behavior data with user behavior characteristics preset in the storage platform, and generating processing result information according to a matching result;
   returning, by the central server, the processing result information to the interaction end; and
   reading and executing, by the interaction end, an instruction set from a local preset configuration file according to the processing result information, wherein the instruction set is used for completing a man-machine interaction with a user.

2. The man-machine interaction method as claimed in claim 1, further comprising after preprocessing, by the interaction end, the user request information, and sending the target request information obtained after preprocessing to the central server, and before assigning, by the central server, the biological recognition task for the target request information, saving the target request information to the storage platform, and distributing the biological recognition task to the computing server:
   for the biological sample information that does not conform to the preset characteristic extraction condition, sending, by the interaction end, an information collection abnormality message to the user and collecting the biological sample information again.

3. The man-machine interaction method as claimed in claim 1, wherein assigning, by the central server, the biological recognition task for the target request information, saving the target request information to the storage platform, and distributing the biological recognition task to the computing server comprises:
  caching, by the central server, the received target request information into a storage queue set up in advance; and
  when the length of the storage queue reaches a preset threshold, starting, by the central server, a processing thread, wherein the processing thread is used for saving the target request information to the storage platform, assigning the biological recognition task for the target request information, and distributing the biological recognition task to the computing server.

4. The man-machine interaction method as claimed in claim 3, wherein when the length of the storage queue reaches the preset threshold, starting, by the central server, the processing thread comprises:
  when the length of the storage queue reaches the preset threshold, taking, by the central server, the thread from a preset thread pool; and
  calling, by the central server, the thread to save the target request information to the storage platform, and distributing the biological recognition task to the computing server.

5. The man-machine interaction method as claimed in claim 1, wherein reading and executing, by the interaction end, the instruction set from the local preset configuration file according to the processing result information comprises:
  when the interaction end fails to read the instruction set from the local preset configuration file, reading and executing, by the interaction end, the instruction set in a cloud preset configuration file from the central server.

6. The man-machine interaction method as claimed in claim 5, wherein when the interaction end fails to read the instruction set from the local preset configuration file, reading and executing, by the interaction end, the instruction set in the cloud preset configuration file from the central server comprises:
  when the interaction end fails to read or execute the instruction set in the cloud preset configuration file from the central server, sending, by the interaction end, alarm information to the user.

7. The man-machine interaction method as claimed in claim 6, further comprising when the interaction end fails to read or execute the instruction set in the cloud preset configuration file from the central server, after sending, by the interaction end, the alarm information to the user:
  sending, by the interaction end, an instruction set read failure message to the central server; and
  locating, by the central server, a physical location of the interaction end according to the instruction set read failure message, so as to prompt that the user needs manual assistance.

8. A man-machine interaction system, comprising:
  an interaction end, a central server, and a computing server that are connected through a network;
  wherein the interaction end is configured to collect user request information, wherein the user request information comprises biological sample information;
  wherein the interaction end is further configured to preprocess the user request information, and send target request information obtained after preprocessing to the central server, wherein the preprocessing comprises filtering out biological sample information that does not conform to a preset characteristic extraction condition;
  wherein the central server is configured to assign a biological recognition task for the target request information, save the target request information to a storage platform, and distribute the biological recognition task to the computing server;
  wherein the computing server is configured to obtain the target request information corresponding to the biological recognition task from the storage platform according to the biological recognition task, extract biological characteristics from the obtained target request information, and return obtained extraction results to the central server;
  wherein the central server is further configured to combine the extraction results to obtain user behavior data, match the user behavior data with user behavior characteristics preset in the storage platform, generate processing result information according to a matching result, and return the processing result information to the interaction end; and
  wherein the interaction end is further configured to read and execute an instruction set from a preset configuration file according to the processing result information, wherein the instruction set is used for completing a man-machine interaction with a user.

9. The man-machine interaction system as claimed in claim 8, wherein the interaction end comprises:
  a checking module, configured for the interaction end to send an information collection abnormality message to the user for the biological sample information that does not conform to the preset characteristic extraction condition, and collect the biological sample information again.

10. The man-machine interaction system as claimed in claim 8, wherein the central server comprises:
  a data caching module, configured for the central server to cache the received target request information into a storage queue set up in advance; and
  a thread processing module, configured for, when the length of the storage queue reaches a preset threshold, the central server to start a processing thread, wherein the processing thread is used for saving the target request information to the storage platform, assigning the biological recognition task for the target request information, and distributing the biological recognition task to the computing server.

11. The man-machine interaction system as claimed in claim 10, wherein the thread processing module comprises:
  a thread allocating sub-module, configured for, when the length of the storage queue reaches the preset threshold, the central server to take the thread from a preset thread pool; and
  a thread executing sub-module, configured for the central server to call the thread to save the target request information to the storage platform, and distribute the biological recognition task to the computing server.

12. The man-machine interaction system as claimed in claim 8, wherein the interaction end comprises:
  an instruction obtaining module, configured for, when the interaction end fails to read the instruction set from the local preset configuration file, the interaction end to read and execute the instruction set in a cloud preset configuration file from the central server.

13. The man-machine interaction system as claimed in claim 12, wherein the instruction obtaining module comprises:
an alarm sub-module, configured for, when the interaction end fails to read or execute the instruction set in the cloud preset configuration file from the central server, the interaction end to send alarm information to the user.

14. The man-machine interaction system as claimed in claim 13, wherein the alarm sub-module comprises:
an alarm information returning unit, configured for the interaction end to send an instruction set read failure message to the central server;
wherein the central server further comprises:
a locating module, configured for the central server to locate a physical location of the interaction end according to the instruction set read failure message, so as to prompt that the user needs manual assistance.

15. A non-transitory readable storage medium that stores a computer-readable instruction, wherein the computer-readable instruction, when executed by one or more processors, causes the one or more processors to perform:
collecting, through an interaction end, user request information, wherein the user request information comprises biological sample information;
preprocessing, through the interaction end, the user request information, and sending target request information obtained after preprocessing to a central server, wherein the preprocessing comprises filtering out biological sample information that does not conform to a preset characteristic extraction condition;
assigning, through the central server, a biological recognition task for the target request information, saving the target request information to a storage platform, and distributing the biological recognition task to a computing server;
obtaining, through the computing server, the target request information corresponding to the biological recognition task from the storage platform according to the biological recognition task, extracting biological characteristics from the obtained target request information, and returning obtained extraction results to the central server;
combining, through the central server, the extraction results to obtain user behavior data, matching the user behavior data with user behavior characteristics preset in the storage platform, and generating processing result information according to a matching result;
returning the processing result information to the interaction end through the central server; and
reading and executing, through the interaction end, an instruction set from a local preset configuration file according to the processing result information, wherein the instruction set is used for completing a man-machine interaction with a user.

16. The non-transitory readable storage medium of claim 15, wherein the computer-readable instruction, when executed by the one or more processors, further causes the one or more processors to perform after preprocessing, through the interaction end, the user request information, and sending the target request information obtained after preprocessing to the central server, and before assigning, through the central server, the biological recognition task for the target request information, saving the target request information to the storage platform, and distributing the biological recognition task to the computing server:
for the biological sample information that does not conform to the preset characteristic extraction condition, sending, through the interaction end, an information collection abnormality message to the user and collecting the biological sample information again.

17. The non-transitory readable storage medium as claimed in claim 15, wherein to perform assigning, through the central server, the biological recognition task for the target request information, saving the target request information to the storage platform, and distributing the biological recognition task to the computing server, the computer-readable instruction, when executed by the one or more processors, causes the one or more processors to perform:
caching the received target request information into a storage queue set up in advance through the central server; and
when the length of the storage queue reaches a preset threshold, starting a processing thread through the central server, wherein the processing thread is used for saving the target request information to the storage platform, assigning the biological recognition task for the target request information, and distributing the biological recognition task to the computing server.

18. The non-transitory readable storage medium as claimed in claim 17, wherein to perform when the length of the storage queue reaches the preset threshold, starting the processing thread through the central server, the computer-readable instruction, when executed by the one or more processors, causes the one or more processors to perform:
when the length of the storage queue reaches the preset threshold, taking the thread from a preset thread pool through the central server; and
calling, through the central server, the thread to save the target request information to the storage platform, and distribute the biological recognition task to the computing server.

19. The non-transitory readable storage medium as claimed in claim 15, wherein to perform reading and executing, through the interaction end, the instruction set from the local preset configuration file according to the processing result information, the computer-readable instruction, when executed by the one or more processors, causes the one or more processors to perform:
when the interaction end fails to read the instruction set from the local preset configuration file, reading and executing, through the interaction end, the instruction set in a cloud preset configuration file from the central server.

20. The non-transitory readable storage medium as claimed in claim 19, wherein to perform when the interaction end fails to read the instruction set from the local preset configuration file, reading and executing, by the interaction end, the instruction set in the cloud preset configuration file from the central server, the computer-readable instruction, when executed by the one or more processors, causes the one or more processors to perform:
when the interaction end fails to read or execute the instruction set in the cloud preset configuration file from the central server, sending, by the interaction end, alarm information to the user.

* * * * *